(12) United States Patent
Yoshitomi et al.

(10) Patent No.: US 7,413,810 B2
(45) Date of Patent: Aug. 19, 2008

(54) POLARIZATION PLATE PROTECTION FILM

(75) Inventors: Yasumasa Yoshitomi, Yokohama (JP);
Tetsuya Toyoshima, Yokohama (JP);
Masanori Yoshihara, Kawasaki (JP)

(73) Assignee: Zeon Corporation, Tokyo (JP)

( * ) Notice: Subject to any disclaimer, the term of this patent is extended or adjusted under 35 U.S.C. 154(b) by 310 days.

(21) Appl. No.: 10/551,640

(22) PCT Filed: Mar. 25, 2004

(86) PCT No.: PCT/JP2004/004222

§ 371 (c)(1),
(2), (4) Date: Sep. 29, 2005

(87) PCT Pub. No.: WO2004/088369

PCT Pub. Date: Oct. 14, 2004

(65) Prior Publication Data
US 2006/0210767 A1 Sep. 21, 2006

(30) Foreign Application Priority Data
Mar. 31, 2003 (JP) ............... 2003-096180

(51) Int. Cl.
*B32B 27/32* (2006.01)
*B32B 17/10* (2006.01)
*B32B 9/04* (2006.01)
*B32B 27/00* (2006.01)

(52) U.S. Cl. ............... 428/500; 428/220; 428/332; 428/339; 428/411.1

(58) Field of Classification Search ............... None
See application file for complete search history.

(56) References Cited

U.S. PATENT DOCUMENTS 6,207,263 B1* 3/2001 Takematsu et al. .......... 428/220
2001/0035929 A1* 11/2001 Nakamura et al. .......... 349/137
2002/0187371 A1 12/2002 Nakajima

FOREIGN PATENT DOCUMENTS

| JP | 2000-336196 A | 12/2000 |
| JP | 2001-4241 A | 4/2001 |
| JP | 2002-221618 A | 8/2002 |
| JP | 2002-286932 A | 10/2002 |
| JP | 2003-29036 A | 1/2003 |

* cited by examiner

Primary Examiner—Sheeba Ahmed
(74) Attorney, Agent, or Firm—Birch, Stewart, Kolasch & Birch, LLP

(57) ABSTRACT

A protective film for polarizing plates comprises an antireflection layer (reflectance≦0.5% at 550 nm) having high refractivity layers and low refractivity layers alternately laminated on a thermoplastic film (photoelastic coefficient≦9.0×$10^{-12}$ Pa$^{-1}$, saturated water absorption<0.05% by weight) and has 0.3 or smaller standard deviation of S, which is obtained by obtaining a reflectance R(λ) at a wavelength λ while λ is increased from 380 to 780 nm by an increment Δλ of 1 nm, calculating S:

$$S = \sum_{\lambda=380}^{780} \Delta\lambda \cdot R(\lambda) \qquad (1)$$

and calculating the standard deviation at 10 points randomly selected within 100 cm² on the surface of the film. When the film is disposed on the surface of the visual side of a display device such as a liquid crystal display device, the film prevents reflection and suppresses fluctuation in distributions of luminance and color difference due to the uniform spectral reflectance within the surface of the film.

14 Claims, 1 Drawing Sheet

POLARIZATION PLATE PROTECTION FILM

TECHNICAL FIELD

The present invention relates to a protective film for polarizing plates. More particularly, the present invention relates to a protective film for polarizing plates which has a uniform spectral reflectance within the surface of the film and is provided with the function of preventing reflection which can suppress fluctuation in the distribution of luminance and the distribution of color difference when the film is disposed on the surface of the visual side of a display device such as a liquid crystal display device.

BACKGROUND ART

Recently, planar display devices such as liquid crystal display devices and organic electroluminescence devices are highlighted as the electronic display device. Since the liquid crystal display device has a smaller size and is more compact than the cathode ray tube display device, various appliances equipped with the liquid crystal display device are being widely used. For example, the demand for downsizing various appliances such as personal computers, video cameras and other consumer appliances is great in the market. Specifically, portable appliances having a small size such as lap top computers and cameras having a liquid crystal monitor have been widely used. It is essential in these appliances that the appliances are equipped with a liquid crystal display device. The demand for improved performance of displays such as display with colors and improved luminance is also great. Since the liquid crystal display devices do not emit light spontaneously, a light source such as a back light and a front light is necessary.

In the liquid crystal device, the linearly polarized incident light is modulated based on the electro-optical property of the liquid crystal layer and visualized by the polarizing plate at the exit side as a signal expressed by variation in the transmission and the color. Since the polarization of light is used as the principle of display, the polarizing plate is the essential member. The polarizing plate is a device which changes natural light into a linearly polarized light. At present, polarizing plates obtained by laminating an optically transparent protective film having a sufficient mechanical strength to one or both faces of a polarizing film, which is prepared by dying a substrate film made of a polyvinyl alcohol film with a dichroic material such as iodine and dichroic dye or by absorption of the dichroic material into the substrate film, followed by stretching and orientation of the resultant film, are mainly used as the polarizing plate for the liquid crystal display devices. As the protective film, in general, a triacetylcellulose film is used. In the liquid crystal display device, in general, the polarizing plate is disposed at both of the exit side and the incident side of the liquid crystal layer.

When a display device such as the liquid crystal display device is used, light from the outside is occasionally reflected at the surface of the display, and difficulty arises in watching images on the display. Overcoming this problem is becoming more important.

Various treatments for preventing reflection of light and various anti-glare treatments have been made on various display devices to overcome the above problem. As one of such treatments, antireflection films are used for various display devices.

As for the polarizing plate for the liquid crystal display device described above, it is attempted that an antireflection layer is disposed on the protective film of the polarizing plate to prevent the problem due to the light from the outside (for example, Patent Reference 1). It is further required for the protective film for the polarizing plate that durability to impact probable in the ordinary condition and to substances present in the ordinary environment be exhibited since the protective film is placed at the outermost surface of the visual side.

The formation of the antireflection layer is, in general, conducted by alternately laminating high refractivity layers and low refractivity layers in accordance with the physical vapor deposition (PVD) process or the chemical vapor deposition (CVD) process. It is also conducted that a hard coat layer or an antifouling layer is formed to provide the durability and the wear resistance described above to the protective film for the polarizing plate.

Patent Reference 1

Japanese Patent Application Laid-Open No. 2002-286932

However, it was found by the studies by the present inventors that, when a polarizing plate was prepared by using a conventional protective film for polarizing plates and mounted to a liquid crystal display device, problems arose in that the distribution of luminance and the distribution of color difference became uneven, and images showed fluctuation, flicker and uneven color.

As the result of the study on the cause of the problems, it was found that, since triacetylcellulose exhibiting a great absorption of water was used in conventional protective film for polarized plates, the easiness of the vapor deposition tended to be different at portions of the film. As the result, the thickness of the antireflection layer became uneven within the surface of the film, and the reflectance fluctuated.

Before the antireflection layer is vapor deposited, it is necessary that the roll of the raw material film be wound and unwound several tens of times to remove water adsorbed to the roll of the raw material film. It was found that microscopic damages were formed on the surface of the film during the repeated winding and unwinding, and wrinkles were formed in the film due to the change in the temperature during the repeated winding and unwinding. These phenomena caused the fluctuation in the reflectance.

Under the above circumstances, the present invention has an object of providing a protective film for polarizing plates which has a uniform spectral reflectance within the surface of the film and is provided with the function of preventing reflection which can suppress fluctuation in the distribution of luminance and the distribution of color difference when the film is disposed on the surface of the visual side of a display device such as a liquid crystal display device.

DISCLOSURE OF THE INVENTION

As the result of intensive studies by the present inventors to develop the protective film for polarizing plates exhibiting the excellent functions described above, it was found that a film which comprised a thermoplastic film having a photoelastic coefficient and a saturated water absorption in respective specific ranges and an antireflection layer formed at least on one face of the thermoplastic film and has a specific value or smaller of a standard deviation of a substantial integral of the spectral reflectance in the region of wavelength of 380 to 780 nm (the standard deviation of values obtained at 10 points randomly selected within an area of 100 cm$^2$ at the surface of the film) was suitable for the object. The present invention has been completed based on the knowledge.

The present invention provides:

(1) A protective film for polarizing plates which comprises a thermoplastic film having a photoelastic coefficient of 9.0×

$10^{-12}$ Pa$^{-1}$ or smaller and a saturated water absorption smaller than 0.05% by weight and an antireflection layer formed by alternately laminating high refractivity layers and low refractivity layers at least on one face of the thermoplastic film and having a reflectance of 0.5% or smaller at a wavelength of 550 nm and has a standard deviation of S of 0.3 or smaller, wherein the standard deviation of S is obtained by obtaining a reflectance R(λ) at a wavelength λ in a region of wavelength of 380 to 780 nm while the wavelength λ is successively increased by an increment of 1 nm from 380 nm to 780 nm, calculating S in accordance with relation (1):

$$S = \sum_{\lambda=380}^{780} \Delta\lambda \cdot R(\lambda) \quad (1)$$

which gives a sum of products of the reflectance R(λ) at a wavelength of λ and the increment of the wavelength between two successive measurements of the reflectance Δλ (=1 nm), and calculating the standard deviation of S obtained at 10 points randomly selected within an area of 100 cm² on a surface of the film;

(2) A protective film for polarizing plates described in (1), wherein the antireflection layer is a layer formed at least on one face of the thermoplastic film while the thermoplastic film is brought into contact with a thermally conductive material having a surface temperature higher than [a glass transition temperature of the thermoplastic film—130° C.] and lower than the glass transition temperature of the thermoplastic film;

(3) A protective film for polarizing plates described in any one of (1) and (2), wherein the antireflection layer is a layer formed in accordance with a physical vapor deposition process or a chemical vapor deposition process;

(4) A protective film for polarizing plates described in any one of (1) to (3), which further comprises at least one hard coat layer;

(5) A protective film for polarizing plates described in (4), wherein the hard coat layer has an average surface roughness of 0.5 μm or smaller;

(6) A protective film for polarizing plates described in any one of (1) to (5), wherein an outermost surface of the thermoplastic film at a side having the antireflection layer has an electric resistance of 1×10$^9$ Ω/☐ or smaller; and (7) A protective film for polarizing plates described in any one of (1) to (6), wherein the thermoplastic film is a film comprising a polymer having an alicyclic structure.

BRIEF DESCRIPTION OF THE DRAWINGS

In FIG. 1, 1 means a feeding roll, 2 means a film for vapor deposition, 3a, 3b, 3c and 3d mean guide rolls, 4 means a drum for film formation, 5-1 and 5-2 mean substances for vapor deposition, 6-1 and 6-2 mean cathodes for film formation, 7 means a winding roll, 8 means a vacuum pump, and 9 means a sputtering apparatus.

THE MOST PREFERRED EMBODIMENT TO CARRY OUT THE INVENTION

Figure 1:
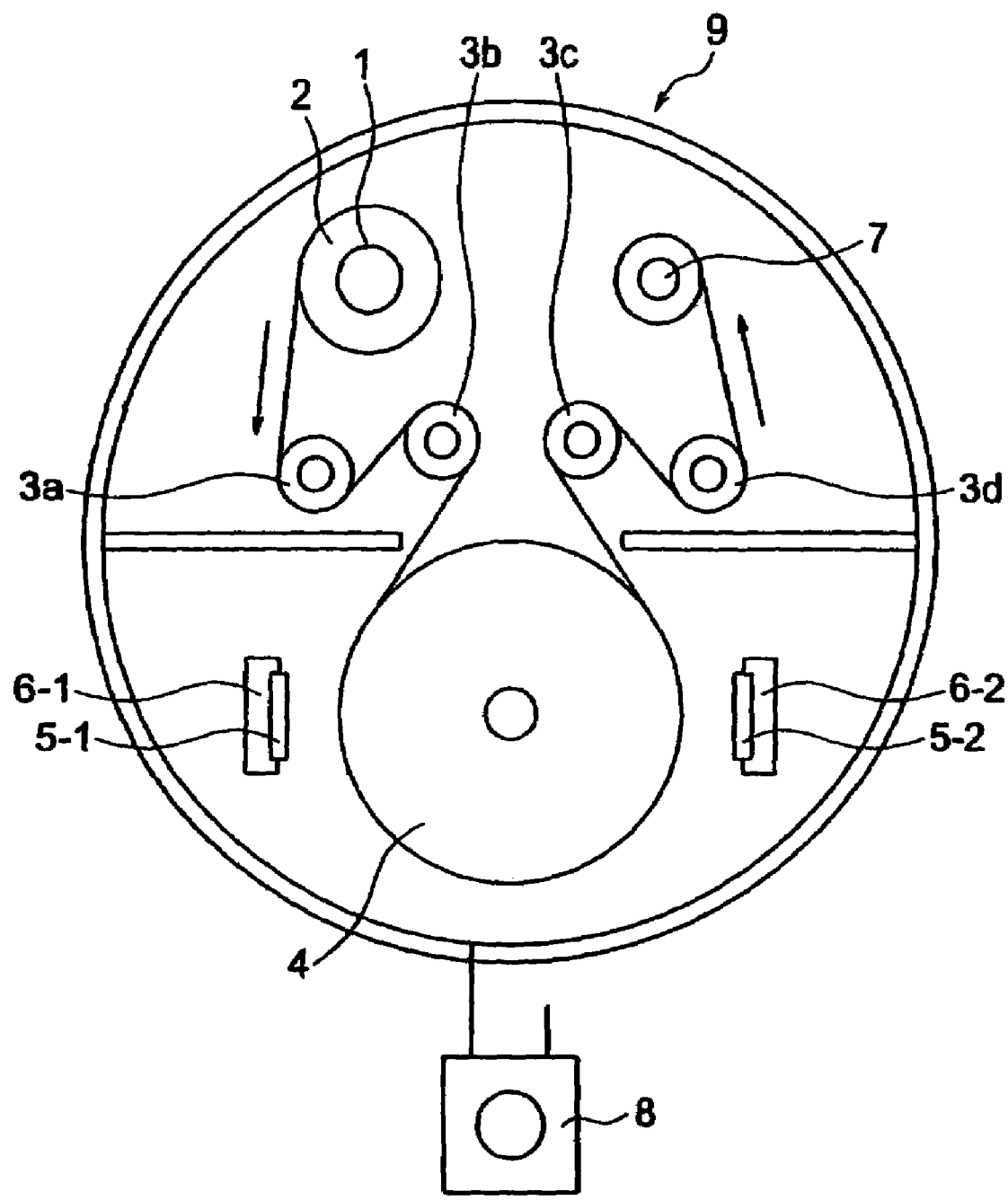
FIG. 1 shows a schematic plan view exhibiting an embodiment of the apparatus for forming an antireflection layer in accordance with the sputtering process.

As the thermoplastic film used as the substrate in the protective film for polarizing plates of the present invention, a film having a photoelastic coefficient of 9.0×10$^{-12}$ Pa$^{-1}$ or smaller and a saturated water absorption smaller than 0.05% by weight is used. The photoelastic coefficient means the change in the value of birefringence when a stress is applied to the substrate. When the film has a photoelastic coefficient exceeding 9.0×10$^{-12}$ Pa$^{-1}$, the optical strain and the birefringence arise during molding of the film, and the object of the present invention cannot be achieved. It is preferable that the photoelastic coefficient is 8.0×10$^{-12}$ Pa$^{-1}$ or smaller and more preferably 7.0×10$^{-12}$ Pa$^{-1}$ or smaller. When the saturated water absorption is 0.05% by weight or greater, the thickness of the formed antireflection layer fluctuates, and it is difficult that the standard deviation of S obtained in accordance with relation (1) described later is made 0.3 or smaller. It is preferable that the saturated water absorption is 0.03% by weight or smaller. The saturated water absorption can be obtained by measuring the increase in the weight after dipping into water at 23° C. for 1 week in accordance with the method of ASTM D570.

The thermoplastic film is not particularly limited as long as the thermoplastic film comprises a thermoplastic resin, satisfies the requirements that the photoelastic coefficient and the saturated water absorption be in the above respective ranges, has transparency and exhibits the function of protecting the polarizing film in a polarizing plate. Specifically, the thermoplastic film can be suitably selected from films of polyolefin-based resins such as polyethylene, polypropylene, poly-4-methylpentene-1 and polybutene-1; polymers having an alicyclic structure; polyester-based resins such as polyethylene terephthalate and polyethylene naphthalate; polycarbonate-based resins; polyvinyl chloride-based resins; polyphenylene sulfide-based resins; polyether sulfone-based resins; polyethylene sulfide-based resins; polyphenylene ether-based resins; styrene-based resins; acrylic resins; polyamide-based resins; and cellulose-based resins such as cellulose acetate; and laminates of these films. Among these films, the films of the polymers having an alicyclic structure are preferable from the standpoint of the photoelastic coefficient, the water absorption, the transparency, the heat resistance and the small birefringence.

Examples of the polymer having an alicyclic structure include (1) norbornene-based polymers, (2) polymers based on cyclic olefins having a single ring, (3) cyclic conjugated diene-based polymers, (4) vinyl alicyclic hydrocarbon polymers and hydrogenation products of these polymers. Among these polymers, norbornene-based polymers are preferable from the standpoint of the transparency and the molding property.

Specific examples of the norbornene-based polymer include polymers obtained by the ring-opening polymerization of norbornene-based monomers, copolymers obtained by the ring-opening copolymerization of norbornene-based monomers with other monomers copolymerizable with the norbornene-based monomers by the ring-opening polymerization, hydrogenation products of these polymers and copolymers, addition polymers of norbornene-based monomers and addition-type copolymers obtained by copolymerization of norbornene-based monomers with other monomers copolymerizable with norbornene-based monomers. Among these polymers, hydrogenation products of polymers obtained by ring-opening polymerization of norbornene-based monomers are preferable from the standpoint of the heat resistance and the transparency.

Examples of the above polymer having an alicyclic structure include polymers disclosed in Japanese Patent Application Laid-Open No. 2002-321302.

It is preferable that the polymer having an alicyclic structure preferably used in the present invention has a glass transition temperature of 80° C. or higher and more preferably in the range of 100 to 250° C. The film comprising the polymer having an alicyclic structure and having a glass transition temperature in the above range exhibits excellent durability without showing deformation or formation of stress under the use at high temperatures.

The polymer having an alicyclic structure preferably used in the present invention has a weight-average molecular weight (Mw) of 10,000 to 100,000, preferably 25,000 to 80,000 and more preferably 25,000 to 50,000, as measured in accordance with the gel permeation chromatography (referred to as GPC, hereinafter) using cyclohexane (or toluene when the polymer resin is not dissolved) as the solvent and expressed as the molecular weight of the corresponding polyisoprene or polystyrene. When the weight-average molecular weight is in the above range, the film is advantageous since the mechanical strength and the workability in molding are excellently balanced.

The molecular weight distribution (the weight-average molecular weight Mw)/the number-average molecular weight (Mn)) of the polymer having an alicyclic structure preferably used in the present invention is not particularly limited. The molecular weight distribution is, in general, 1.0 to 10.0, preferably in the range of 1.0 to 4.0 and more preferably in the range of 1.2 to 3.5.

It is preferable that the film comprising the polymer having an alicyclic structure preferably used in the present invention has a content of volatile components of 0.05% or smaller and more preferably 0.03% or smaller. When the content of the volatile components is in the above range, the dimensional stability of the film is improved, and the uneven lamination in the formation of a hard coat layer can be suppressed. Moreover, a uniform antireflection layer can be formed on the entire surface of the film, and the effect of preventing reflection can be obtained uniformly throughout the entire surface of the film.

The volatile components are substances having a molecular weight of 200 or smaller which are contained in the substrate film in small amounts, such as residual monomers and solvents. The content of the volatile components is the total of the contents of the substances having a molecular weight of 200 or smaller which are contained in the polymer having an alicyclic structure. The content of volatile components can be determined in accordance with the analysis of the gas chromatography.

The film of a thermoplastic resin used in the present invention may further comprise other compounding ingredients. The other compounding ingredients are not particularly limited. Examples of the other compounding ingredient include inorganic fine particles; stabilizers such as antioxidants, heat stabilizers, light stabilizers, weathering stabilizers, ultraviolet light absorbents and near infrared light absorbents; resin modifiers such as lubricants and plasticizers; coloring agents such as dyes and pigments; and antistatic agents. The compounding ingredients can be used singly or in combination of two or more. The amount can be suitably selected within the range which do not adversely affect the object of the present invention.

Examples of the process for forming the thermoplastic film used in the present invention include the solution casting process and the melt extrusion molding process. Between these processes, the melt extrusion molding process is preferable since the amount of volatile components in the film and the fluctuation in the thickness can be decreased. Examples of the melt extrusion molding process include the process using a die and the inflation process. The process using a T-die is preferable due to the excellent productivity and accuracy of the thickness.

When the process using a T-die is used for producing the substrate film, it is preferable that the melt temperature of the thermoplastic resin in the extruder having a T-die is set at a temperature higher than the glass transition temperature of the thermoplastic resin by 80 to 180° C. and more preferably 100 to 150° C. When the melt temperature in the extruder is excessively low, there is the possibility that the fluidity of the thermoplastic resin is insufficient. When the melt temperature in the extruder is excessively high, there is the possibility that the resin is degraded. It is also preferable that the thermoplastic resin is preliminarily dried before being used for the preparation of the film. The preliminary drying is conducted, for example, by using a drier with the heated air after the raw material is formed into pellets. Foaming of the extruded resin can be prevented by the preliminary drying.

One or both surfaces of the thermoplastic film used in the present invention may be treated, for example, by oxidation or by a treatment of forming rough surfaces, where desired, so that adhesion with the antireflection layer disposed on the surfaces is enhanced. Examples of the treatment of the surface by oxidation include the treatment by corona discharge, the treatment by chromic acid (a wet process), the treatment by flame, the treatment by the heated air and the irradiation with ultraviolet light in the presence of ozone. Examples of the treatment of forming rough surfaces include the treatment by sand blasting and the treatment with a solvent. The surface treatment is suitably selected in accordance with the type of the plastic film. In general, the treatment by corona discharge is preferable from the standpoint of the effect and the operability. The substrate film may be treated by forming a primer on one or both faces thereof.

The thickness of the thermoplastic film is selected, in general, in the range of 30 to 300 µm and preferably in the range of 40 to 200 µm.

In the present invention, an antireflection film is formed at least on one face of the above thermoplastic film by alternately laminating high refractivity layers and low refractivity layers. The high refractivity layer means a layer having a refractive index of 1.8 or greater, and the low refractivity layer means a layer having a refractive index of 1.7 or smaller. Examples of the substance having a great refractive index forming the high refractivity layer include indium oxide doped with titanium (ITO), tantalum oxide, titanium oxide, indium oxide, zirconium oxide, niobium oxide, hafnium oxide, cerium oxide, antimony-doped tin oxide (ATO), tin oxide, zinc oxide and aluminum oxide. The substance having a great refractive index may be used singly or in combination of two or more. Examples of the substance having a small refractive index forming the low refractivity layer include $MgF_2$, $CaF_2$ and $SiO_2$. The substance having a small refractive may be used singly or in combination of two or more. In place of the substance having a known refractive index as described above, a material having the refractive index which is made variable by dispersing ultrafine particles into the matrix material and adjusted to the prescribed value may be used. Examples of the candidate of the fine particles dispersed into the matrix material include inorganic fluorides such as magnesium fluoride, fine particles of silica, fine vacuum cavities and fine cavities containing a gas such as the air and nitrogen gas. For obtaining the material having a small refractive index, it is preferable that a material comprising silica-based hollow fine particles dispersed in a matrix material is used. As the process for forming the layer comprising the fine particles, a coating composition obtained by dispersing the fine particles in a material for forming the matrix is applied to form a coating layer, which is then dried. The thickness of the antireflection layer is not particularly limited and can be suitably selected in accordance with the situation. The thickness is selected, in general, in the range of 0.01 to 1.0 µm and preferably in the range of 0.02 to 0.5 µm.

In the present invention, the antireflection layer can be formed in accordance with the physical vapor deposition (PVD) process or the chemical vapor deposition (CVD) process. Between these processes, the PVD process is frequently used.

The PVD process includes the vacuum evaporation process, the sputtering process and the ion plating process. In the vacuum vapor deposition process, a substance for vaporization is vaporized by heating in accordance with a method such as the resistance heating, the electron beam heating, the laser beam heating and the arc discharge in a vacuum of about $10^{-2}$ to $10^{-5}$, and a thin film layer is formed on the surface of the thermoplastic film. In the sputtering process, a substance for vaporization is sputteringly vaporized by clashing of a cation such as $Ar^+$ accelerated by the glow discharge or the like against a target (the substance for vaporization) in a vacuum of about 1 to $10^{-1}$ in which an inert gas such as argon gas is present, and a thin film layer is formed on the surface of the thermoplastic film. Examples of the sputtering vaporization include the direct current (DC) sputtering, the radio frequency (RF) sputtering, the magnetron sputtering and the bias sputtering. The ion plating process is a process as a combination of the vacuum vapor deposition process and the sputtering process. In this process, an atom for vaporization released by heating is ionized and accelerated in an electric field in a vacuum of about 1 to $10^{-1}$ and attached to the surface of the thermoplastic film in the condition having a high energy, and a thin film layer is formed.

The process for forming the antireflection layer in accordance with the sputtering process, among the PVD processes described above, will be described with reference to FIG. 1.

FIG. 1 shows a schematic plan view exhibiting an embodiment of the apparatus for forming the antireflection layer in accordance with the sputtering process.

The sputtering apparatus 9 shown in FIG. 1 comprises a feeding roll 1, guide rolls 3a, 3b, 3c and 3d, a drum for film formation 4, cathodes for film formation 6-1 and 6-2 having substances for vapor deposition 5-1 and 5-2, a winding roll 7 and a vacuum pump 8. A long sheet of a film for vapor deposition 2 which is wound to form a roll is mounted to a feeding roll 1.

The apparatus in FIG. 1 has two substances for vapor deposition and two cathodes for film formation. However, the apparatus is not limited to the construction shown in FIG. 1.

After the film for vapor deposition 2 mounted to the feeding roll 1 is unwound from the feeding roll 1, the film 2 is lead by a plurality of guide rolls 3a and 3b, brought into contact with the outer circumference of the drum for film formation 4, goes through other guide rolls 3c and 3d and wound by a winding roll 7. Cathodes for film formation 6-1 and 6-2 having the substance for vapor deposition 5-1 and 5-2 are disposed in peripheral positions of the drum for film formation 4. A high refractivity layer and a low refractivity layer are continuously formed on the surface of the film 2 placed around the circumference of the drum for film formation 4 in accordance with the sputtering process. The film for vapor deposition 2 to which the antireflection layer has been laminated is lead to guide rolls 3c and 3d disposed at the side opposite to the side of the guide rolls 3a and 3b and wound by the winding roll 7. A laminate layer having alternately formed high refractivity layers and low refractivity layers can be obtained by repeating the procedures described above. While the film is formed in accordance with the sputtering process, the sputtering apparatus 9 is kept being evacuated by a vacuum pump 8, and a working gas and a reactive gas necessary for the film formation are introduced from cylinders which are not shown in the Figure. Examples of the working gas include inert gases and, specifically, rare gases such as argon gas. As the reactive gas, in general, oxygen gas is used.

In the present invention, it is preferable that the antireflection layer is formed at least on one face of the thermoplastic film while the thermoplastic film is brought into contact with a thermally conductive material (the drum for film formation 4 in FIG. 1) having a surface temperature higher than [the glass transition temperature of the thermoplastic film—130° C.] and lower than the glass transition temperature of the thermoplastic film and, preferably, a surface temperature in the range of [the glass transition temperature of the thermoplastic film—120° C.] to [the glass transition temperature of the thermoplastic film—50° C.]. Since the movement of atoms in the vapor deposited layer on the surface of the thermoplastic film is accelerated due to this procedure, the thickness and the refractive index of the film formed by the vapor deposition are made uniform, and fluctuation in the reflectance can be decreased.

The antireflection film having a reflectance of 0.5% or smaller at the wavelength of 550 nm is formed at least on one face of the thermoplastic film as described above. The protective film for polarizing plates of the present invention has a standard deviation of S of 0.3 or smaller. The standard deviation of S is obtained by obtaining the reflectance R(λ) at a wavelength λ in the region of wavelength of 380 to 780 nm while the wavelength λ is successively increased by an increment Δλ of 1 nm from 380 nm to 780 nm, calculating S in accordance with relation (1):

$$S = \sum_{\lambda=380}^{780} \Delta\lambda \cdot R(\lambda) \quad (1)$$

which gives the sum of products of the reflectance R(λ) at the wavelength of λ and the increment of the wavelength between two successive measurements of the reflectance Δλ (=1 nm), and calculating the standard deviation of S obtained at 10 points randomly selected within an area of 100 cm² on the surface of the film. When the standard deviation exceeds 0.3, the fluctuation of the spectral reflectance within the surface of the film increases. As the result, the distribution of luminance and the distribution of color difference become uneven, and images show fluctuation, flicker and uneven distribution of color when a polarizing plate is prepared by using the obtained protective film for polarizing plates and mounted to a liquid crystal display device. It is preferable that the standard deviation is 0.1 or smaller and more preferably 0.05 or smaller.

Since the protective film for polarizing plates of the present invention is disposed at the outermost surface of the visual side of a display device such as a liquid crystal display device, it is preferable that the protective film further comprises at least one hard coat layer. The hard coat layer is disposed, in general, between the substrate film and the antireflective layer. For the hard coat layer, any of the hard coat material of the thermosetting type and the hard coat material of the ionizing radiation curing type can be used.

The hard coat material of the thermosetting type described above is not particularly limited, and a suitable material can be selected from conventional hard coat materials. The hard coat material of the thermosetting type comprises, in general, a thermosetting resin as the main component and, where desired, other resins, curing agents and solvents. Examples of the thermosetting resin include acrylate-based polymers having carbon-carbon double bond or glycidyl group, unsaturated polyesters, isoprene polymers, butadiene polymers, epoxy resins, phenol resins, urea resins, silicone resins and melamine resins. The hard coat material of the thermosetting type may be used singly or in combination of two or more.

The other resin is used for adjusting viscosity of the coating fluid and providing desired properties to the hard coat layer and can be suitably selected from various types of thermosetting resins. The curing agent can be suitably selected, for example, from organic peroxides, azo compounds, polyisocyanate compounds, polyamines, acid anhydrides, imidazoles and Lewis acids in accordance with the type of the used thermosetting resin.

To the hard coat material of the thermosetting type, various types of fillers such as silica, alumina and hydrated alumina may be added, where desired, for adjusting the refractive index, improving the bending modulus, stabilizing the shrinkage of volume and improving the heat resistance of the hard coat layer. Various additives such as antioxidants, ultraviolet light absorbents, light stabilizers, leveling agents and defoaming agents may also be added.

Among the hard coat material of the thermosetting type, silicone-based hard coat materials are preferable since a hard coat layer having a great hardness can be obtained. The hard coat layer formed with the silicone-based hard coat material is preferable also due to improved adhesion or reaction with the component for forming the antifouling layer, which is formed where necessary, such as an antifouling compound including a silicon compound having a perfluoroalkyl group and a hydrolyzable group.

Examples of the hard coat material of the ionizing radiation curing type include hard coat materials comprising photopolymerizable prepolymers and/or photopolymerizable monomers and, where desired, photopolymerization initiators. The hard coat material of the ionizing radiation curing type means a hard coat material having an energy quantum in an electromagnetic wave or charged particles, i.e., a hard coat material which is crosslinked and cured by irradiation with ultraviolet light or electron beams.

The hard coat material of the ionizing radiation curing type includes hard coat materials of the cationic polymerization type and hard coat materials of the radical polymerization type. In the hard coat material of the cationic polymerization type, an epoxy resin or vinyl ether-based compound is used as the photopolymerizable prepolymer, and a compound composed of an onium such as an aromatic sulfonium ion, an aromatic oxosulfonium ion and an aromatic iodonium ion and an anion such as a tetrafluoroborate, a hexafluorophosphate, a hexafluoroantimonate and hexafluoroarsenate is used as the photopolymerization initiator. The above compounds may be used singly or in combination of two or more.

In the hard coat material of the radical polymerization type, an unsaturated polyester-based prepolymer or an acrylate-based prepolymer is used as the photopolymerizable prepolymer. Among these prepolymers, the acrylate-based prepolymer is preferable. Examples of the acrylate-based prepolymer include prepolymers of polyester acrylates, prepolymers of epoxyacrylates, prepolymers of urethane acrylates and prepolymers of polyol acrylates. The prepolymer of a polyester acrylate can be obtained, for example, by obtaining a polyester oligomer having hydroxyl groups at both ends by condensation of a polyfunctional carboxylic acid with a polyhydric alcohol, followed by esterification of the hydroxyl groups in the obtained oligomer with (meth)acrylic acid; or by obtaining an oligomer having hydroxyl groups at both ends by addition of an alkylene oxide to a polyfunctional carboxylic acid, followed by esterification of the hydroxyl groups of the obtained oligomer with (meth)acrylic acid. The prepolymer of an epoxyacrylate can be obtained, for example, by esterification of oxirane rings in an epoxy resin of a bisphenol type or a novolak type having a relatively low molecular weight by the reaction with (meth)acrylic acid. The prepolymer of a urethane acrylate can be obtained, for example, by obtaining a polyurethane oligomer by the reaction of a polyether polyol or a polyester polyol with a polyisocyanate, followed by esterification of the obtained oligomer with (meth)acrylic acid. The prepolymer of polyol acrylate can be obtained, for example, by esterification of hydroxyl groups in a polyether polyol with (meth)acrylic acid. The above photopolymerizable prepolymer may be used singly or in combination of two or more. As the photopolymerizable monomer, a monomer can be suitably selected from various types of polyfunctional (meth)acrylates. A compound suitably selected from various types of monofunctional (meth)acrylates can be used as the reactive diluent.

Examples of the photopolymerization initiator used where desired in the hard coat material of the radical polymerization type include benzoin-based initiators, acetophenone-based initiators, phenylketone-based initiators, benzophenone-based initiators, anthraquinone-based initiators, thioxanthone-based initiators and ketal-based initiators. The photopolymerization initiator may be used singly or in combination of two or more. When electron beams are used as the ionizing radiation, it is not necessary that the photopolymerization initiator is added.

Similarly to the hard coat material of the thermosetting type, where desired, various types of fillers such as silica, alumina and hydrated alumina may be added to the hard coat material of the ionizing radiation curing type for adjusting the refractive index, improving the bending modulus, stabilizing the shrinkage of volume and improving the heat resistance of the hard coat layer. Various additives such as antioxidants, ultraviolet light absorbents, light stabilizers, leveling agents and defoaming agents may also be added.

In the preparation of the hard coat material of the thermosetting type or the ionizing radiation curing type, a suitable solvent may be used, where necessary. Examples of the solvent used in the above preparation include aliphatic hydrocarbons such as hexane, heptane and cyclohexane, aromatic hydrocarbons such as toluene and xylene, halogenated hydrocarbons such as methylene chloride and ethylene chloride, alcohols such as methanol, ethanol, propanol and butanol, ketones such as acetone, methyl ethyl ketone, 2-pentanone and isophorone, esters such as ethyl acetate and butyl acetate and cellosolve-based solvents such as ethylcellosolve.

The concentration and the viscosity of the coating fluid thus prepared is not particularly limited as long as the coating fluid can be used for coating and can be suitably selected in accordance with the situation.

In the present invention, as the hard coat material, the hard coat material of the ionizing radiation curing type is preferable from the standpoint of the property for forming the hard coat layer such as the curing reactivity, and the acrylic hard coat material of the radical polymerization type which is curable with ultraviolet light is more preferable from the standpoint of the curing reactivity, the surface hardness and the workability.

In the present invention, the hard coat material described above is applied to the thermoplastic film in accordance with a conventional process such as the bar coating process, the knife coating process, the roll coating process, the blade coating process, the die coating process and the gravure coating process to form a coating film, and the formed coating film is dried. The hard coat layer is formed by curing the coating film by heating when the hard coat material of the thermosetting type is used, and by irradiation with an ionizing radiation when the hard coat material of the ionizing radiation curing type is used.

As the ionizing radiation, for example, ultraviolet light or electron beams are used. Ultraviolet light can be obtained from a high voltage mercury lamp, a fusion H lamp or a xenon lamp. The amount of irradiation is, in general, about 50 to 500 mJ/cm$^2$. Electron beams are obtained from an electron beam accelerator, and the amount of irradiation is, in general, about 100 to 350 kV.

It is preferable that the thickness of the hard coat layer formed as described above is in the range of 0.5 to 30 µm. When the thickness is smaller than 0.5 µm, the surface hardness of the protective film for polarizing plates is insufficient, and there is the possibility that the scratch resistance is not sufficiently exhibited. When the thickness exceeds 30 µm, shrinkage by curing and shrinkage under heat and moisture increase. Therefore, curling of the protective film for polarizing plates tends to take place, and crack are occasionally formed. Moreover, the disadvantage in the productivity arises. It is more preferable that the thickness of the hard coat layer is in the range of 1 to 20 µm and most preferably in the range of 2 to 15 µm.

It is preferable that the average surface roughness of the hard coat layer is 0.5 µm or smaller. When the surface roughness exceeds 0.5 µm, it is difficult that the antireflection layer having a uniform thickness is formed, and the object of the present invention is occasionally not achieved. It is more preferable that the average surface roughness is 0.3 µm or smaller and most preferably 0.1 µm or smaller.

In the protective film for polarizing plates of the present invention, where necessary, an antifouling layer may be formed on the antireflection layer. The antifouling layer is formed to provide the surface of the polarizing plate with the water repelling property, the oil repelling property, the perspiration resistance and the antifouling property. As the material for forming the antifouling layer, a suitable material can be selected from various organic compounds in accordance with the degree of the water repelling property and the oil repelling property to be provided. As the preferable material forming a film exhibiting the excellent water repelling and oil repelling properties, organic compounds having fluorine atom can be used. Examples of the compound exhibiting the water repelling property include fluorocarbons, perfluorosilanes and macromolecular compounds derived from these compounds, among the above organic compounds. For exhibiting an improved property for wiping out finger prints, macromolecular compounds having an oil repelling group such as methyl group are preferable. The thickness of the antifouling layer is decided in accordance with the purpose. The thickness is, in general, 1 to 50 nm and preferably 3 to 35 nm. As the process for forming the antifouling layer, various coating processes can be used in accordance with the material used for the formation. Examples of the coating process include the vacuum film forming processes such as the vacuum vapor deposition process, the sputtering process, the ion plating process, the plasma CVD process and the plasma polymerization and the wet processes such as micro-gravure process, the screen coating process and the dip coating process.

In the protective film for polarizing plates of the present invention, it is preferable that the electric resistance of the uppermost surface of the thermoplastic film at the side having the antireflection layer is $1 \times 10^9$ Ω/☐ or smaller from the standpoint of the antistatic property. When the electric resistance of the surface exceeds $1 \times 10^9$ Ω/☐, the antistatic effect is not sufficiently exhibited, and there is the possibility that dusts in the air are attached to the surface due to the static electricity. It is preferable that the electric resistance is $1 \times 10^8$ Ω/☐ or smaller and most preferably $1 \times 10^7$ Ω/☐ or smaller. The antifouling layer may be suitably selected so that the electric resistance is adjusted in the above range, or an antistatic layer may be further formed on the uppermost layer, where necessary. By adjusting the electric resistance of the surface of the film within the above range, attachment of dusts in the air to the surface of the film can be prevented, and breaking and malfunction of electronic members due to the static electricity can also be prevented.

The protective film for polarizing plates of the present invention can be applied to a polarizing plate as shown in the following.

The polarizing plate in a liquid crystal display device is disposed at the exit side and, in general, also at the incident side of a liquid crystal cell. In general, for the preparation of the polarizing plate, a polarizing film is prepared by dying a substrate film made of a polyvinyl alcohol film with a dichroic material such as iodine and dichroic dye or by absorption of the dichroic material into the substrate film, followed by unidirectional stretching and orientation of the resultant film, and a protective film such as a film of triacetylcellulose (TAC) is laminated to both faces of the obtained polarizing film. When the protective film for polarizing plates of the present invention is used as the protective film having the antireflection property for the polarizing plate described above, a protective film for polarizing plates having an antireflection layer formed on one side may be laminated to the protective film of the polarizing plate at the exit side in a manner such that the antireflection layer is placed at the outer side, or a protective film for polarizing plates having an antireflection layer may be used in place of the protective film of the polarizing film at the exit side in a manner such that the antireflection layer is placed at the outer side.

EXAMPLES

The present invention will be described more specifically with reference to examples in the following. However, the present invention is not limited to the examples.

The photoelastic coefficient and the saturated water absorption of a thermoplastic film were measured in accordance with the following methods.

(1) Photoelastic Coefficient

Retardation within the surface of a thermoplastic film was measured using an apparatus for measuring retardation [manufactured by OJI Scientific Instruments; "KOBRA-21ADH"] while a load in the range of 50 to 150 g was applied to the film. The obtained value was divided by the thickness of the film, and the value of birefringence Δn was obtained. A series of the values of Δn were obtained in this manner under various loads, and a load-Δn curve was obtained. The slope of the curve was used as the photoelastic coefficient.

(2) Saturated Water Absorption

The saturated water absorption was obtained by measuring the increase in the weight after dipping into water at 23° C. for 1 week in accordance with the method of ASTM D570.

The properties of a protective film for polarizing plates obtained in Example and Comparative Examples were obtained in accordance with the following methods.

(3) Content of Volatile Components

The contents of components having a molecular weight of 200 or smaller were obtained in accordance with the gas chromatography, and the content of volatile components was obtained as the total of the obtained contents.

(4) Reflectance at Wavelength of 550 nm

The reflectance at the wavelength of 550 nm was obtained at 10 points randomly selected within an area of 100 cm$^2$ on the surface of a film using a spectrophotometer [manufactured by NIPPON BUNKO Co., Ltd.; an ultraviolet visible light spectrophotometer "V-570"], and the average of the obtained ten values was used as the reflectance.

(5) Standard Deviation

At 10 points randomly selected within an area of 100 cm$^2$ on the surface of a film, the reflectance $R(\lambda)$ at a wavelength of $\lambda$ was obtained using a spectrophotometer [manufactured by NIPPON BUNKO Co., Ltd.; an ultraviolet visible light spectrophotometer "V-570"] while the wavelength $\lambda$ was increased by an increment of 1 nm in the region of wavelength from 380 nm to 780 nm, and the value of S was obtained in accordance with relation (1) at each point of the measurement. The standard deviation was obtained from the values of S at the 10 points.

(6) Adhesion

The adhesion was evaluated in accordance with the so-called test method of grid peeling. Two sets, intersecting each other at the right angle, of 11 cutting lines separated by a distance of 1 mm were formed in a sample by a cutter over the antifouling layer, and 100 portions of 1 mm square were formed in the form of a grid on the surface. A cellophane pressure-sensitive adhesive tape (manufactured by SEKISUI KAGAKU Co., Ltd.]) was attached to the surface, and the attached tape was peeled in the direction perpendicular to the surface. The adhesion was evaluated by the number of the portion remaining on the surface of the film among the 100 portions.

(7) Surface Resistance

The surface resistance was measured using a double ring probe [a resistivity meter manufactured by MITSUBISHI CHEMICAL Co., Ltd.; "HIGHRESTER UPMCP-HT450 type"].

(8) Average Surface Roughness

The average surface roughness was measured by a microscope for ultra-deep measurement of the shape "VK-850 [manufactured by KEYENS Corporation].

(9) Distribution of Luminance, Distribution of Color Difference and Luminance

A protective film for a polarizing plate in a commercial liquid crystal display device was removed, and an antireflective protective film obtained in Example or Comparative Example was mounted in place of the removed film. Using the obtained liquid crystal display device, the distribution of luminance and the distribution of color difference were measured using a conoscope [manufactured by autronic-MELCHERS GmbH]. The measurement was conducted at the central portion of the film, and the dependency on the steric angle was examined.

The distribution of luminance and the distribution of color difference were evaluated in accordance with the following criterion:

good: The distribution of luminance and the distribution of color difference were symmetrical with respect to the central portion of the display device.

fair: Some unevenness was found on the distribution of luminance and the distribution of color difference.

poor: Unevenness was found on the distribution of luminance and the distribution of color difference.

The luminance was obtained as the value in the normal direction at the central portion of the display device.

Preparation Example 1

Pellets of a norbornene-based polymer [manufactured by ZEON Corporation; "ZEONOR 1420"; Tg: 135° C.; the saturated water absorption: smaller than 0.01% by weight] were dried at 70° C. for 2 hours by a heated air drier through which the air was passed. Using the dried pellets, a film having a thickness of 40 μm and a length of 300 m was formed by extrusion using a melt extruder of the T-die type having a melt mixer for resins and equipped with a screw of 65 mmφ under the condition of a temperature of the melt resin of 240° C. and a width of the T-die of 500 mm. The obtained long sheet of the film was wound to obtain a roll.

The film prepared from the norbornene-based polymer (referred to as Film A, hereinafter) had a photoelastic coefficient of $6.3 \times 10^{-12}$ Pa$^{-1}$, a saturated water absorption of 0.01% by weight and a content of volatile components smaller than 0.01% by weight.

Preparation Example 2

Preparation of a Primer Solution

A hydrogenation product of a styrene-butadiene-styrene block copolymer modified with maleic anhydride [manufactured by ASAHI KASEI Corporation; TUFTECH M1913; the melt index: 4.0 g/10 minutes at 200° C. under a load of 49 N; the content of the styrene block: 30% by weight; the degree of hydrogenation: 80% or greater; the amount of addition of maleic anhydride: 2%] in an amount of 2 parts by weight was dissolved into a mixed solvent of 8 parts by weight of xylene and 40 parts by weight of methyl isobutyl ketone. The obtained solution was filtered through a filter made of polytetrafluoroethylene and having a pore diameter of 1 μm, and the complete solution alone was used as the primer solution.

Preparation Example 3

Preparation of a Hard Coat Material

A hexafunctional urethane acrylate oligomer [manufactured by SHIN NAKAMURA Chemical Co., Ltd.; the trade name: "NK OLIGO U-6HA"] in an amount of 30 parts by weight, 40 parts by weight of butyl acrylate, 30 parts by weight of isobornyl methacrylate [manufactured by SHIN NAKAMURA KAGAKU Co., Ltd.; the trade name: "NK ESTER IB"] and 10 parts by weight of a photopolymerization initiator (2,2-dimethoxy-1,2-diphenylethan-1-one) were mixed by a homogenizer, and a hard coat material comprising a resin composition of the ultraviolet curing type was prepared.

Example 1

One face of the long sheet of Film A obtained in Preparation Example 1 was treated by the corona discharge in accordance with the conventional process. The treated surface was coated with the primer solution obtained in Preparation Example 2 in an amount such that the thickness of the primer layer after being dried was 0.5 μm using a die coater. The formed coating layer was dried in a drying oven at 80° C. for 5 minutes, and a primer layer was formed.

The formed primer layer was coated continuously with the hard coat material obtained in Preparation Example 3 in an amount such that the thickness of the hard coat layer obtained after being cured was 5 μm using a die coater. After the formed coating layer was dried at 80° C. for 5 minutes, the obtained hard coat layer was irradiated with ultraviolet light (the accumulated amount of light: 320 mJ/cm$^2$), and the hard coat layer was cured. The hard coat layer was formed continuously in this manner, and the obtained sheet was wound to form a roll. The hard coat layer after being cured had an average thickness of 5 μm and an average surface roughness of 0.2 μm.

On the hard coat layer of Film A having the hard coat layer described above, 15 nm of an ITO layer, 35 nm of an SiO$_2$ layer, 134 nm of an ITO layer and 93 nm of an SiO$_2$ layer were laminated successively in this order from the side of the hard coat layer in accordance with the continuous sputtering process under the condition of an ultimate degree of vacuum of $1 \times 10^{-5}$ Pa, a degree of vacuum during the film formation of 0.3 Pa, a winding speed of 2 m/min and a surface temperature of the drum for film formation of 80° C., and an antireflection film was formed.

To the uppermost SiO$_2$ layer in the antireflection layer, a coating fluid prepared by diluting a fluorine-based surface antifouling coating material [manufactured by DAIKIN KOGYO CO., Ltd.; the trade name: "OPTOOL DSX"] with perfluorohexane to the concentration of 0.1% by weight was applied in accordance with the dip coating process to form an antifouling layer. After the coating fluid was applied, the formed coating layer was dried by heating at 60° C. for 1 minute. After an antifouling layer having a thickness of 5 nm was formed, the film was wound, and a long sheet of Protective film for polarizing plates 1 was obtained. The properties of the Protective film for polarizing plates 1 are shown in Table 1. The results of evaluation conducted by using Protective film for polarizing plates 1 are shown in Table 2.

Comparative Example 1

A long sheet of Protective film for polarizing plates 2 was obtained in accordance with the same procedures as those conducted in Example 1 except that a triacetylcellulose (TAC) film having a thickness of 40 μm [manufactured by KONICA Co., Ltd.; the trade name: "KC4UX2M"; Tg: 120° C.; the photoelastic coefficient: $32.4 \times 10^{-12}$ Pa$^{-1}$; the saturated water absorption: 4.5% by weight; the content of volatile components: 6.0% by weight] was used in place of Film A, and the surface temperature of the drum for film formation was changed to 10° C. in the sputtering process. The properties of Protective film for polarizing plates 2 are shown in Table 1. The results of evaluation conducted by using Protective film for polarizing plates 2 are shown in Table 2.

Comparative Example 2

A long sheet of protective film for polarizing plates 3 was obtained in accordance with the same procedures as those conducted in Example 1 except that a polyethylene terephthalate (PET) film having a thickness of 38 μm [manufactured by TORAY Industries, Inc.; the trade name: "Lumirror T60#38"; Tg: 69° C.; the photoelastic coefficient: $50 \times 10^{-12}$ Pa$^{-1}$; the saturated water absorption: 0.8% by weight; the content of volatile components: 0.9% by weight] was used in place of Film A, and the surface temperature of the drum for film formation was changed to 10° C. in the sputtering process. The properties of Protective film for polarizing plates 3 are shown in Table 1. The results of evaluation conducted by using Protective film for polarizing plates 3 are shown in Table 2.

TABLE 1

|  | Example 1 | Comparative Example 1 | Comparative Example 2 |
|---|---|---|---|
| Substrate film |  |  |  |
| thermoplastic resin | norbornene-based polymer | triacetyl-cellulose | polyethylene terephthalate |
| thickness (μm) | 40 | 40 | 38 |
| glass transition temperature Tg (° C.) | 135 | 120 | 69 |
| photoelastic coefficient ($\times 10^{-12}$ Pa$^{-1}$) | 6.3 | 32.4 | 50 |
| saturated water absorption (% by weight) | 0.01 | 4.5 | 0.8 |
| content of volatile components (% by weight) | 0.01> | 6.0 | 0.9 |
| Properties of protective film for polarizing plates |  |  |  |
| Protective film for polarizing plates | 1 | 2 | 3 |
| reflectance at wavelength of 550 nm (%) | 0.4 | 0.5 | 0.5 |
| standard deviation | 0.20 | 0.65 | 0.50 |
| surface resistance (Ω/□) | $3 \times 10^8$ | $4 \times 10^8$ | $4 \times 10^8$ |
| average surface roughness (μm) | 0.35 | 0.65 | 0.55 |

TABLE 2

|  | Protective film for polarizing plates | | |
|---|---|---|---|
|  | 1 | 2 | 3 |
| Adhesion | 100/100 | 20/100 | 100/100 |
| Luminance (cd/m$^2$) | 300 | 220 | 250 |
| Distribution of luminance | good | poor | fair |
| Distribution of color difference | good | poor | fair |

Notes to Tables 1 and 2
1) The standard deviation was obtained in accordance with the method described above in (5) in the measurements of the properties of the protective film for polarizing plates.
2) The luminance is the value in the normal direction at the central portion of the display device.
3) The distribution of luminance and the distribution of color difference are distributions dependent on the steric angle with respect to the central portion of the display device.

The following are shown by the results in Tables 1 and 2. As shown in Example 1, the protective film for polarizing plates of the present invention exhibited excellent adhesion, distribution of luminance and distribution of color difference since the reflectance at the wavelength of 550 nm was 0.5% or smaller, and the standard deviation of S calculated in accordance with relation (1) is 0.3 or smaller. On the other hand, the protective films for polarizing plates of Comparative Examples exhibiting the photoelastic coefficients and the saturated water absorption of the thermoplastic film at the outside of the ranges specified by the present invention showed a great standard deviation although the reflectance was 0.5% or smaller. Therefore, the protective films for polarizing plates of Comparative Examples exhibited inferior adhesion, distribution of luminance and distribution of color difference.

INDUSTRIAL APPLICABILITY

In accordance with the present invention, the film having a uniform spectral reflectance within the surface of the film and provided with the function of preventing reflection which can suppress fluctuation in the distribution of luminance and the distribution of color difference when the film is disposed on the surface of the visual side of a display device such as a liquid crystal display device, can be provided.

The invention claimed is:

1. A protective film for polarizing plates which comprises a thermoplastic film having a photoelastic coefficient of $9.0 \times 10^{-12}$ $Pa^{-1}$ or smaller and a saturated water absorption smaller than 0.05% by weight and an antireflection layer formed by alternately laminating high refractivity layers and low refractivity layers at least on one face of the thermoplastic film; wherein said protective film has a reflectance of 0.5% or smaller at a wavelength of 550 nm and has a standard deviation of S of 0.3 or smaller, wherein the standard deviation of S is obtained by obtaining a reflectance $R(\lambda)$ at a wavelength $\lambda$ in a region of wavelength of 380 to 780 nm while the wavelength $\lambda$ is successively increased by an increment of 1 nm from 380 nm to 780 nm, calculating S in accordance with relation (1):

$$S = \sum_{\lambda=380}^{780} \Delta\lambda \cdot R(\lambda) \quad (1)$$

which gives a sum of products of the reflectance $R(\lambda)$ at a wavelength of $\lambda$ and the increment of the wavelength between two successive measurements of the reflectance $\Delta\lambda$ (=1 nm), and calculating the standard deviation of S obtained at 10 points randomly selected within an area of 100 cm² on a surface of the film.

2. A protective film for polarizing plates according to claim 1, wherein the antireflection layer is a layer formed at least on one face of the thermoplastic film while the thermoplastic film is brought into contact with a thermally conductive material having a surface temperature higher than X and lower than Y, wherein X=Tg (glass transition temperature of the thermoplastic film) −130°C. and Y=Tg.

3. A protective film for polarizing plates according to claims 1, wherein the antireflection layer is a layer formed in accordance with a physical vapor deposition process or a chemical vapor deposition process.

4. A protective film for polarizing plates according to claim 1, which further comprises at least one hard coat layer.

5. A protective film for polarizing plates according to claim 4, wherein the hard coat layer has an average surface roughness of 0.5 μm or smaller.

6. A protective film for polarizing plates according to claim 1, wherein an outermost surface of the thermoplastic film at a side having the antireflection layer has an electric resistance of $1 \times 10^9$ Ω/□ or smaller.

7. A protective film for polarizing plates according to claim 1, wherein the thermoplastic film is a film comprising a polymer having an alicyclic structure.

8. A protective film for polarizing plates according to claim 1, wherein the photoelastic coefficient is $8.0 \times 10^{-12}$ $Pa^{-1}$ or smaller.

9. A protective film for polarizing plates according to claim 1, wherein the standard deviation of S is 0.1 or smaller.

10. A protective film for polarizing plates according to claim 4, wherein the thickness of the hard coat layer is from 0.5 to 30μ.

11. A protective film for polarizing plates according to claim 4, wherein the hard coat layer comprises a hard coat material which is curable by ionizing radiation.

12. A protective film for polarizing plates according to claim 7, wherein the polymer having an alicyclic structure is a polymer having a norbornene structure.

13. A protective film for polarizing plates according to claim 6, wherein the electric resistance is $1 \times 10^8$ Ω/□ or smaller.

14. A protective film for polarizing plates according to claim 1, wherein the thermoplastic film is obtained by a melt extrusion molding process using a T-die.

* * * * *